(12) United States Patent
Higashi et al.

(10) Patent No.: US 10,702,926 B2
(45) Date of Patent: Jul. 7, 2020

(54) ROTARY CUTTING BLADE MATERIAL AND METHOD FOR MANUFACTURING THE SAME

(71) Applicant: SUMITOMO ELECTRIC HARDMETAL CORP., Itami-shi (JP)

(72) Inventors: Taisuke Higashi, Itami (JP); Satoru Kukino, Itami (JP)

(73) Assignee: Sumitomo Electric Hardmetal Corp., Itami-shi (JP)

( * ) Notice: Subject to any disclaimer, the term of this patent is extended or adjusted under 35 U.S.C. 154(b) by 6 days.

(21) Appl. No.: 15/776,138

(22) PCT Filed: Aug. 10, 2017

(86) PCT No.: PCT/JP2017/029101
§ 371 (c)(1),
(2) Date: May 15, 2018

(87) PCT Pub. No.: WO2018/066231
PCT Pub. Date: Apr. 12, 2018

(65) Prior Publication Data
US 2018/0345380 A1   Dec. 6, 2018

(30) Foreign Application Priority Data
Oct. 7, 2016   (JP) ................... 2016-199278

(51) Int. Cl.
*B23B 27/14* (2006.01)
*B23B 5/10* (2006.01)
*B22F 7/06* (2006.01)
*B23B 51/00* (2006.01)
*B23C 5/16* (2006.01)
*C22C 29/08* (2006.01)
(Continued)

(52) U.S. Cl.
CPC ............ *B22F 7/06* (2013.01); *B22F 3/14* (2013.01); *B22F 5/00* (2013.01); *B22F 7/062* (2013.01);
(Continued)

(58) Field of Classification Search
CPC ........ B23C 2226/125; B23C 2226/315; B23C 2240/08; B23C 5/16; B23C 5/18;
(Continued)

(56) References Cited

U.S. PATENT DOCUMENTS 3,085,453 A * 4/1963 Mossberg ............... B23B 51/06
76/108.1
4,880,707 A   11/1989 Kohno et al.
(Continued)

FOREIGN PATENT DOCUMENTS

CN   1423586 A   6/2003
JP   2015-520661 A   7/2015
(Continued)

*Primary Examiner* — Sara Addisu
(74) *Attorney, Agent, or Firm* — Baker Botts L.L.P.; Michael A. Sartori

(57) ABSTRACT

A rotary cutting blade material has an attaching structure forming portion that is to serve as an attaching portion to the shank, a cutting structure forming portion that is to serve as a cutting blade, and a joint portion. The cutting structure forming portion has a core portion and a surface portion provided on the attaching structure forming portion with the joint portion being interposed, and the surface portion covers at least a part of a surface of the core portion. The attaching structure forming portion includes a hard material including a hard component and one or two or more types of iron group elements, and the hard material has a Young's modulus of not more than 350 GPa. The core portion includes a cemented carbide material, and the surface portion includes PCD or CBN.

8 Claims, 4 Drawing Sheets

(51) Int. Cl.
  *C22C 27/04* (2006.01)
  *B22F 5/00* (2006.01)
  *B22F 3/14* (2006.01)
  *B23C 5/18* (2006.01)
  *C22C 26/00* (2006.01)

(52) U.S. Cl.
  CPC ............... *B23B 51/00* (2013.01); *B23C 5/16* (2013.01); *B23C 5/18* (2013.01); *C22C 27/04* (2013.01); *C22C 29/08* (2013.01); *B22F 2005/001* (2013.01); *B22F 2301/20* (2013.01); *B22F 2302/10* (2013.01); *B22F 2302/205* (2013.01); *B23B 2226/125* (2013.01); *B23B 2226/315* (2013.01); *B23B 2240/08* (2013.01); *B23B 2260/124* (2013.01); *B23C 2226/125* (2013.01); *B23C 2226/315* (2013.01); *B23C 2228/10* (2013.01); *B23C 2240/08* (2013.01); *B23C 2240/24* (2013.01); *C22C 2026/003* (2013.01)

(58) Field of Classification Search
  CPC . B23C 51/10; B23C 51/1009; B23C 51/1018; B23C 2228/10; B23C 51/16; B23B 27/14; B23B 2226/125; B23B 2226/315; B23B 2251/02; B23B 2224/28; B23B 2224/32; Y10T 407/1904; Y10T 407/1946; Y10T 407/1948; Y10T 407/1952; Y10T 407/1966
  See application file for complete search history.

(56) References Cited

U.S. PATENT DOCUMENTS

| | | | | |
|---|---|---|---|---|
| 5,020,780 A | * | 6/1991 | Woodings | C21B 7/12 266/271 |
| 5,070,748 A | * | 12/1991 | Packer | B23C 5/006 407/118 |
| 5,443,337 A | * | 8/1995 | Katayama | B23B 27/146 407/118 |
| 5,685,671 A | * | 11/1997 | Packer | B23C 5/1018 407/118 |
| 5,899,642 A | * | 5/1999 | Berglow | B23B 31/11 279/8 |
| 5,947,660 A | * | 9/1999 | Karlsson | B23B 31/00 408/230 |
| 5,988,953 A | * | 11/1999 | Berglund | B23B 51/02 408/1 R |
| 6,152,657 A | * | 11/2000 | Packer | B23C 5/1018 407/118 |
| 6,511,265 B1 | * | 1/2003 | Mirchandani | B22F 7/06 407/118 |
| 6,551,035 B1 | * | 4/2003 | Bruhn | B23B 31/11 408/144 |
| 7,559,382 B2 | * | 7/2009 | Koch | B23B 51/02 175/415 |
| 8,272,816 B2 | * | 9/2012 | Mirchandani | B22F 7/062 407/118 |
| 9,393,629 B2 | | 7/2016 | Barry et al. | |
| 2005/0133277 A1 | * | 6/2005 | Dixon | B23C 5/1009 175/426 |
| 2008/0206001 A1 | * | 8/2008 | Bozkurt | B23D 77/00 407/32 |
| 2015/0097321 A1 | * | 4/2015 | Kasonde | B22F 3/14 264/626 |

FOREIGN PATENT DOCUMENTS

| | | |
|---|---|---|
| KR | 10-1999-0067512 A | 8/1998 |
| WO | 98/10881 A1 | 3/1998 |
| WO | 0143899 A1 | 6/2001 |
| WO | 2013/156536 A1 | 10/2013 |
| WO | 2016/135332 A1 | 9/2016 |

* cited by examiner

ROTARY CUTTING BLADE MATERIAL AND METHOD FOR MANUFACTURING THE SAME

TECHNICAL FIELD

The present invention relates to a rotary cutting blade material and a method for manufacturing the same. The present application claims the priority based on Japanese Patent Application No. 2016-199278 which is the Japanese patent application filed on Oct. 7, 2016, the entire contents of which are hereby incorporated by reference.

BACKGROUND ART

Japanese National Patent Publication No. 2015-520661 (PTD 1) describes that a construction having a superhard structure, which is to be processed into a cutting blade of a rotary cutting tool, is attached to a tool carrier. Specifically, attaching means such as a thread groove for brazing the above-described construction and the tool carrier is, for example, provided in the above-described construction, which makes it possible to attach the above-described construction to the tool carrier.

CITATION LIST

Patent Document

PTD 1: Japanese National Patent Publication No. 2015-520661

SUMMARY OF INVENTION

A rotary cutting blade material according to one aspect of the present disclosure is a rotary cutting blade material for a rotary cutting blade attached to a shank for use, the rotary cutting blade material having an attaching structure forming portion that is to serve as an attaching portion to the shank, a cutting structure forming portion that is to serve as a cutting blade, and a joint portion, the cutting structure forming portion having a core portion and a surface portion provided on the attaching structure forming portion with the joint portion being interposed, the surface portion covering at least a part of a surface of the core portion, the attaching structure forming portion including a hard material including a hard component and one or two or more types of iron group elements, the hard material having a Young's modulus of not more than 350 GPa, the core portion including a cemented carbide material, the surface portion including PCD (polycrystalline diamond) or CBN (cubic boron nitride), the hard component being at least one selected from the group consisting of W (tungsten), WC (tungsten carbide), TiC (titanium carbide), TiCN (titanium carbonitride), $Al_2O_3$ (alumina), and a combination of at least one of CBN (cubic boron nitride) and diamond and at least one of W and WC.

A method for manufacturing the rotary cutting blade material according to another aspect of the present disclosure has: an assembling step of assembling a precursor of the rotary cutting blade material by using a first precursor for forming the attaching structure forming portion, a second precursor for forming the core portion, and a third precursor for forming the surface portion; and a sintering step of sintering the precursor of the rotary cutting blade material.

DETAILED DESCRIPTION

Figure 1A:
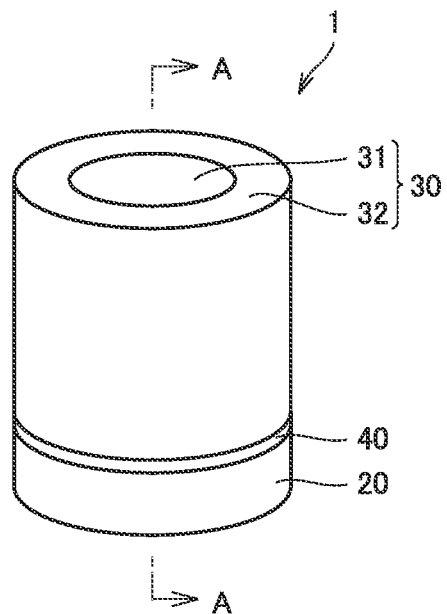
FIG. 1A is a perspective view of a rotary cutting blade material showing one aspect of the present embodiment.

Problem to be Solved by the Present Disclosure

A cutting blade of a rotary cutting tool such as a drill and an end mill is worn out when used. Therefore, after the cutting performance decreases or a prescribed period of use elapses, a cutting head including at least the cutting blade is replaced with a new cutting head. At this time, if the cutting head is attached to a superhard shank in a non-removable manner, the superhard shank must be replaced together at the timing of replacement of the cutting blade, even when replacement of the superhard shank is unnecessary because the superhard shank does not reach the end of the service life. Such replacement of the superhard shank is not preferable in terms of cost because the superhard shank is relatively expensive. Thus, it is conceivable to removably attach the cutting head to the superhard shank so as to be able to replace only the cutting head when the cutting blade is worn out.

However, the construction described in PTD 1 has room for further improvement in formation of the attaching means for attaching the construction to the tool carrier and brazing.

The present disclosure has been made in light of the above-described circumstances, and an object of the present disclosure is to provide a rotary cutting blade material excellent in attachability to a shank, and a method for manufacturing the same.

Advantageous Effect of the Present Disclosure

According to the present disclosure, there can be provided a rotary cutting blade material excellent in attachability to a shank, and a method for manufacturing the same.

DESCRIPTION OF EMBODIMENTS OF THE PRESENT INVENTION

First, an embodiment of the present invention will be listed and described.

[1] A rotary cutting blade material according to one aspect of the present invention is a rotary cutting blade material for a rotary cutting blade attached to a shank for use, the rotary cutting blade material having an attaching structure forming portion that is to serve as an attaching portion to the shank, a cutting structure forming portion that is to serve as a cutting blade, and a joint portion, the cutting structure forming portion having a core portion and a surface portion provided on the attaching structure forming portion with the joint portion being interposed, the surface portion covering at least a part of a surface of the core portion, the attaching structure forming portion including a hard material including a hard component and one or two or more types of iron group elements, the hard material having a Young's modulus of not more than 350 GPa, the core portion including a cemented carbide material, the surface portion including PCD (polycrystalline diamond) or CBN (cubic boron nitride), the hard component being at least one selected from the group consisting of W (tungsten), WC (tungsten carbide), TiC (titanium carbide), TiCN (titanium carbonitride), Al$_2$O$_3$ (alumina), and a combination of at least one of CBN (cubic boron nitride) and diamond and at least one of W and WC.

[2] The surface portion covers the core portion such that the core portion is not exposed to the outside.

[3] In the rotary cutting blade material, at least a part of the joint portion includes one or two or more types of iron group elements.

[4] In the rotary cutting blade material, a portion of the joint portion between the attaching structure forming portion and the surface portion includes one or two or more types of iron group elements.

[5] In the rotary cutting blade material, the core portion has a hollow portion therein, and the attaching structure forming portion has an inner core portion arranged in the hollow portion.

[6] In the rotary cutting blade material, the hard material has a Young's modulus of less than 300 GPa.

[7] In the rotary cutting blade material, the hard material has an elongation of not more than 5%.

[8] The rotary cutting blade material is a rotary cutting blade material for a rotary cutting blade attached to a shank for use, the rotary cutting blade material having an attaching structure forming portion that is to serve as an attaching portion to the shank, a cutting structure forming portion that is to serve as a cutting blade, and a joint portion, the cutting structure forming portion having a core portion and a surface portion provided on the attaching structure forming portion with the joint portion being interposed, the surface portion covering at least a part of a surface of the core portion, the attaching structure forming portion including a hard material including W (tungsten), iron and nickel, the hard material having a Young's modulus of less than 300 GPa and an elongation of less than 5%, the core portion including a cemented carbide material, the surface portion including CBN (cubic boron nitride), a portion of the joint portion between the attaching structure forming portion and the surface portion being a material including one or two or more types of iron group elements.

[9] A method for manufacturing the rotary cutting blade material according to another aspect of the present invention has: an assembling step of assembling a precursor of the rotary cutting blade material by using a first precursor for forming the attaching structure forming portion, a second precursor for forming the core portion, and a third precursor for forming the surface portion; and a sintering step of sintering the precursor of the rotary cutting blade material.

[10] In the method for manufacturing the rotary cutting blade material, in the assembling step, the second precursor and the third precursor are arranged on the first precursor with a material including one or two or more types of iron group elements being interposed.

Details of Embodiments of the Present Invention

Figure 1B:
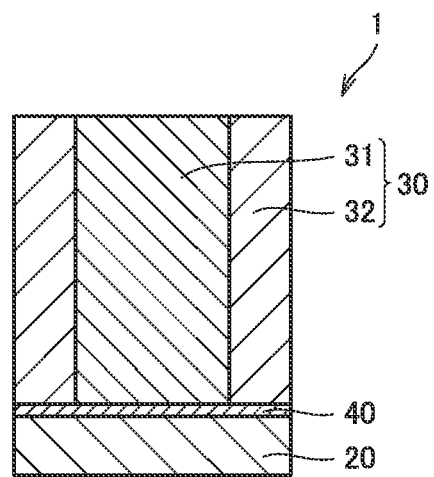
FIG. 1B is a cross-sectional view taken along line A-A in FIG. 1A.
Figure 3:
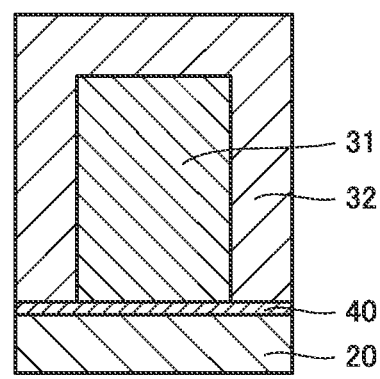
FIG. 3 is a cross-sectional view of a rotary cutting blade material showing a further aspect of the present embodiment.
Figure 4:
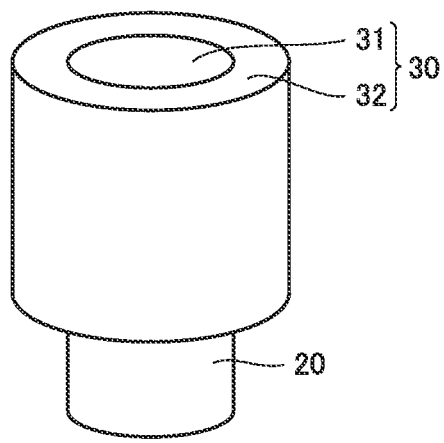
FIG. 4 is a perspective view of a rotary cutting blade material showing a further aspect of the present embodiment.
Figure 5:
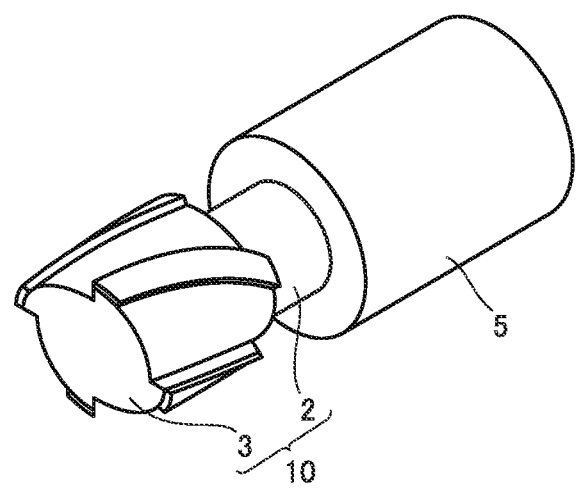
FIG. 5 is a perspective view of a rotary cutting blade obtained from the rotary cutting blade material in the present embodiment.

A specific example of a rotary cutting blade material and a method for manufacturing the same according to the present embodiment will be described hereinafter with reference to the drawings. FIG. 1A is a perspective view of a rotary cutting blade material showing one aspect of the present embodiment, and FIG. 1B is a cross-sectional view taken along line A-A in FIG. 1A. FIG. 2 is a cross-sectional view of a rotary cutting blade material showing another aspect of the present embodiment. FIG. 3 is a cross-sectional view of a rotary cutting blade material showing a further aspect of the present embodiment. FIG. 4 is a perspective view of a rotary cutting blade material showing a further aspect of the present embodiment. FIG. 5 is a perspective view of a rotary cutting blade obtained from the rotary cutting blade material in the present embodiment.

[Structure of Rotary Cutting Blade Material]

A rotary cutting blade material 1 in the present embodiment is a material for a rotary cutting blade attached to a shank 5 for use. As shown in FIGS. 1A and 1B, rotary cutting blade material 1 in the present embodiment has an attaching structure forming portion 20 that is to serve as an attaching portion 2 to shank 5, a cutting structure forming portion 30 that is to serve as a cutting blade, and a joint portion 40. As shown in FIG. 5, attaching portion 2 is obtained from attaching structure forming portion 20 and a cutting portion 3 is obtained from cutting structure forming portion 30, and thus, a rotary cutting blade (cutting head) 10, which has cutting portion 3 and attaching portion 2, and is attached to shank 5 by attaching portion 2 for use, is obtained from rotary cutting blade material 1.

(Attaching Structure Forming Portion)

Attaching structure forming portion 20 serves as attaching portion 2 for attachment to shank 5 in rotary cutting blade 10 obtained by processing rotary cutting blade material 1 described above (FIG. 5). When rotary cutting blade 10 is attached to shank 5 by mechanical fastening such as screw fastening, pinning, other type of engagement, and press fitting, attaching portion 2 subjected to cutting processing or grinding processing to be processed into a prescribed shape of a thread groove, a pin hole or the like is formed in attaching structure forming portion 20. When rotary cutting blade 10 is attached to shank 5 by brazing, attaching structure forming portion 20 itself may serve as attaching portion 2, or may be processed into a prescribed shape as needed to serve as attaching portion 2.

A shape and a size of attaching structure forming portion 20 are selected such that cutting processing or grinding processing for forming a structure for mechanical fastening such as screw fastening, pinning, other type of engagement, and press fitting can be performed, or such that brazing to shank 5 can be performed.

As shown in FIG. 1A, attaching structure forming portion 20 in the present embodiment has such a cylindrical shape that a joint surface of attaching structure forming portion 20 to cutting structure forming portion 30 has a circular shape identical to that of a joint surface of cutting structure forming portion 30 to attaching structure forming portion 20.

Although FIG. 1A shows cylindrical attaching structure forming portion 20 having the circular joint surface, the shape of attaching structure forming portion 20 is not limited to the cylindrical shape and may be any shape such as an elliptic cylindrical shape, a polygonal prism shape including a triangular prism shape, a quadrangular prism shape and the like, a conical shape, and a polygonal pyramid shape. Although FIG. 1B shows attaching structure forming portion 20 having a rectangular longitudinal cross section (which is a cross section in a direction perpendicular to the joint surface to cutting structure forming portion 30, and corresponds to a cross section taken along line A-A in FIG. 1A), the shape of the longitudinal cross section is not limited thereto and may be any shape such as a trapezoidal shape and a triangular shape. In addition, the joint surface of attaching structure forming portion 20 may have a shape and a size identical to those of the joint surface of cutting structure forming portion 30 as shown in FIG. 1B, or may have a shape and a size different from those of the joint surface of cutting structure forming portion 30 as shown in, for example, FIG. 4.

A height (a length in the direction perpendicular to the joint surface to cutting structure forming portion 30) of attaching structure forming portion 20 is not particularly limited as long as attaching structure forming portion 20 has a height that allows cutting processing or grinding processing for forming a structure for mechanical fastening, a height that allows brazing, and a height that allows a vibration reducing effect to be offered in attaching portion 2 obtained by processing attaching structure forming portion 20. For example, in attaching structure forming portion 20 having the shape shown in FIG. 1A, a diameter of the joint surface may be set to 5 mm to 30 mm and a height of attaching structure forming portion 20 may be set to 1 mm to 20 mm.

Attaching structure forming portion 20 is made of a hard material including a hard component and at least one element selected from an iron group element. The hard component is at least one selected from the group consisting of W (tungsten), WC (tungsten carbide), TiC (titanium carbide), TiCN (titanium carbonitride), $Al_2O_3$ (alumina), and a combination of at least one of CBN (cubic boron nitride) and diamond and at least one of W and WC. The iron group element is any one of cobalt, iron and nickel. The iron group element serves as a sintering aid used to form a sintered material from the hard component.

The hard material preferably includes W (tungsten) of the above-described hard component, and preferably includes at least one of iron and nickel of the above-described iron group element.

The hard material may include another component such as copper as a component other than the above-described hard component and the above-described iron group element.

A content of the hard component included in the hard material is preferably not lower than 50% by mass, more preferably not lower than 80% by mass, and further preferably not lower than 90% by mass, with respect to a total mass of the hard material. A total content of iron, nickel and cobalt included in the hard material is preferably not higher than 50% by mass, more preferably not higher than 20% by mass, and further preferably not higher than 10% by mass, with respect to the total mass of the hard material.

When at least one hard component selected from the group consisting of W (tungsten), WC (tungsten carbide), TiC (titanium carbide), TiCN (titanium carbonitride), $Al_2O_3$ (alumina), and a combination of at least one of CBN (cubic boron nitride) and diamond and at least one of W and WC is used as the hard component of attaching structure forming portion 20, the hardness of attaching structure forming portion 20 can be made lower than that of a core portion 31 including a cemented carbide material and a surface portion 32 including PCD (polycrystalline diamond) or CBN (cubic boron nitride), and thus, the excellent free-cuttability can be provided to attaching structure forming portion 20. As a result, cutting processing or grinding processing performed on attaching structure forming portion 20 for screw fastening, pinning and other type of engagement can be facilitated. When W (tungsten) that is a metal material is used as the above-described hard component, the brazing wettability of attaching portion 2 can be improved at the time of processing attaching structure forming portion 20 into attaching portion 2 and brazing attaching portion 2 to shank 5.

The present inventors have newly found that since attaching structure forming portion 20 includes the hard material having the specific properties, attaching portion 2 formed from attaching structure forming portion 20 produces the vibration reducing effect of suppressing chatter and breakage when rotary cutting blade 10 is attached to shank 5 for use, and thus, the service life of rotary cutting blade 10 can be improved.

A reason for this is estimated as follows. Since attaching structure forming portion 20 includes the hard material having the specific properties, the rigidity of attaching structure forming portion 20 can be made smaller than that of core portion 31 including the cemented carbide material and surface portion 32 including PCD or CBN. As a result, when rotary cutting blade 10 is obtained using the rotary cutting blade material in the present embodiment, attaching portion 2 to shank 5 formed from attaching structure forming portion 20 is also likely to elastically deform. Therefore, a load applied to above-described attaching portion 2 when rotary cutting blade 10 is used as a rotary cutting tool can be reduced, and thus, breakage of rotary cutting blade 10 can be suppressed.

In addition, attaching portion 2 of rotary cutting blade 10 is easily affected by vibrations when rotary cutting blade 10 is used as a rotary cutting tool. However, when attaching portion 2 is made of a material that is likely to deform as described above, attaching portion 2 is likely to absorb the vibrations, and thus, a rotary cutting tool with reduced chatter and excellent vibration reducing property (anti-vibration property) can be provided.

In order to form such attaching structure forming portion 20, it is preferable to use, as the hard material, a material having a Young's modulus of less than 500 GPa at the temperature of 25° C., it is more preferable to use, as the hard material, a material having a Young's modulus of less than 400 GPa at the temperature of 25° C., it is further preferable to use, as the hard material, a material having a Young's modulus of not more than 350 GPa at the temperature of 25° C., and it is the most preferable to use, as the hard material, a material having a Young's modulus of less than 300 GPa at the temperature of 25° C. The above-described Young's modulus is a value measured in accordance with a tensile test.

In addition, as described below, attaching structure forming portion 20 and core and surface portions 31 and 32 that form cutting structure forming portion 30 are integrated by sintering. The present inventors have found that in the case of using attaching structure forming portion 20 including the hard material, core portion 31 including the cemented carbide material, and surface portion 32 including PCD or CBN, the joining property between attaching structure forming portion 20 and core and surface portions 31 and 32 during sintering may in some cases decrease when the integration is performed by sintering as described above.

A cause of this is estimated as follows. Specifically, due to temperature change during sintering, deformation (thermal expansion) occurs in each of attaching structure forming portion 20, core portion 31 and surface portion 32. The degree of deformation of attaching structure forming portion 20, core portion 31 and surface portion 32 varies depending on a difference in material forming each portion. The hard material forming attaching structure forming portion 20 is more likely to deform than the cemented carbide material forming core portion 31 and the material including PCD or CBN forming surface portion 32. Such a difference in deformation during sintering is likely to cause a reduction in joining property between attaching structure forming portion 20 and core and surface portions 31 and 32 during sintering.

The present inventors have found that adjustment of an elongation of the above-described hard material makes it possible to suppress the reduction in joining property during sintering. Specifically, the elongation of the above-described hard material is preferably not more than 5%, more preferably not more than 1%, and further preferably not more than 0.5%. When the elongation of the hard material is not more than 5%, the plastic deformability of attaching structure forming portion 20 made of the above-described hard material can be reduced. As a result, deformation of attaching structure forming portion 20 caused by temperature change during sintering is reduced, and thus, the difference in deformation between attaching structure forming portion 20 and core and surface portions 31 and 32 of cutting structure forming portion 30 during sintering can be reduced. As a result, the reduction in joining property between attaching structure forming portion 20 and surface portion 32 caused due to the difference in deformation between attaching structure forming portion 20 and cutting structure forming portion 30 can be suppressed. The above-described elongation is a value measured in accordance with a tensile test.

As described above, attaching structure forming portion 20 in the present embodiment is formed using the hard material including the hard component and the iron group element and having the specific properties, and thus, cutting processing or grinding processing for mechanical fastening for attachment to shank 5, and brazing for attachment to shank 5 can be facilitated. In addition, the vibration reducing effect of suppressing chatter and breakage when rotary cutting blade 10 is attached to shank 5 for use can be obtained. Furthermore, by adjusting the elongation of the hard material, the excellent joining property between attaching structure forming portion 20 and core and surface portions 31 and 32 of cutting structure forming portion 30 during sintering can also be achieved.

The Young's modulus and the elongation of the hard material can be adjusted in accordance with the type and the content of the hard component and the iron group element in the hard material.

(Cutting Structure Forming Portion)

Cutting structure forming portion 30 is processed to form cutting portion 3 having the cutting blade in rotary cutting blade 10 obtained by processing rotary cutting blade material 1 (FIG. 5). As shown in FIG. 1A, cutting structure forming portion 30 in the present embodiment has a cylindrical shape. A size of a bottom surface of the cylinder and a height of the cylinder forming cutting structure forming portion 30 are not particularly limited as long as cutting portion 3 having the cutting blade can be formed by cutting processing or grinding processing. For example, in cutting structure forming portion 30 having the shape shown in FIG. 1A, a diameter of the bottom surface may be set to 5 mm to 30 mm and the height may be set to 5 mm to 30 mm.

Although FIG. 1A shows cylindrical cutting structure forming portion 30, the shape of cutting structure forming portion 30 is not limited to the cylindrical shape and may be any shape such as an elliptic cylindrical shape, a polygonal prism shape including a triangular prism shape, a quadrangular prism shape and the like, a conical shape, and a polygonal pyramid shape. Although FIG. 1B shows cutting structure forming portion 30 having a rectangular longitudinal cross section (which is a cross section in a direction perpendicular to the joint surface to attaching structure forming portion 20, and corresponds to a cross section taken along line A-A in FIG. 1A), the shape of the longitudinal cross section is not limited thereto and may be any shape such as a trapezoidal shape and a triangular shape. In addition, the joint surface of cutting structure forming portion 30 to attaching structure forming portion 20 may have a shape and a size identical to or different from those of the joint surface of attaching structure forming portion 20.

Cutting structure forming portion 30 in the present embodiment has core portion 31 and surface portion 32 provided on attaching structure forming portion 20 with joint portion 40 being interposed. Surface portion 32 covers a part of a surface of the core portion. Specifically, as shown in FIG. 1B, surface portion 32 is provided to cover at least a part of the surface of core portion 31 other than the surface that is in contact with joint portion 40. In the portion where surface portion 32 covers core portion 31, core portion 31 and surface portion 32 are joined by sintering described below. A size of each of core portion 31 and surface portion 32 may be selected such that the desired cutting blade can be formed by cutting processing or grinding processing, and a diameter of a bottom surface and a height of each of core portion 31 and surface portion 32 may be selected in consideration of a size and a shape of the formed cutting blade, and a size required for joining to attaching structure forming portion 20. For example, in cutting structure forming portion 30 having the shape shown in FIG. 1B, the diameter of the bottom surface of core portion 31 may be set to 3 mm to 27 mm and the height of core portion 31 may be set to 5 mm to 30 mm. In addition, an outer diameter of the bottom surface of surface portion 32 may be set to 5 mm to 30 mm and the height of surface portion 32 may be set to 5 mm to 30 mm.

(Core Portion)

As shown in FIGS. 1A and 1B, core portion 31 in the present embodiment is provided in a central portion of cutting structure forming portion 30 and has a solid cylindrical shape. Although FIGS. 1A and 1B show solid cylindrical core portion 31, the shape of core portion 31 is not limited to the cylindrical shape and may be any shape such as an elliptic cylindrical shape, a polygonal prism shape including a triangular prism shape, a quadrangular prism shape and the like, a conical shape, and a polygonal pyramid shape. Core portion 31 may have a solid shape or a hollow shape.

A hollow portion formed in core portion 31 may be shaped to penetrate from a surface of core portion 31 on a side where core portion 31 is joined to attaching structure forming portion 20 to a surface of core portion 31 on a side opposite to the side where core portion 31 is joined to attaching structure forming portion 20, or may be shaped to penetrate only to one of these surfaces, or may be shaped not to penetrate to any of these surfaces.

Figure 2A:
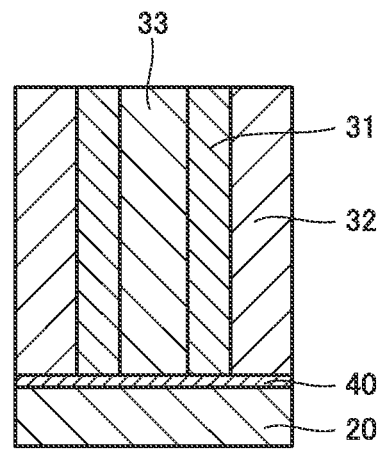
FIG. 2A is a cross-sectional view of a rotary cutting blade material showing another aspect of the present embodiment.
Figure 2B:
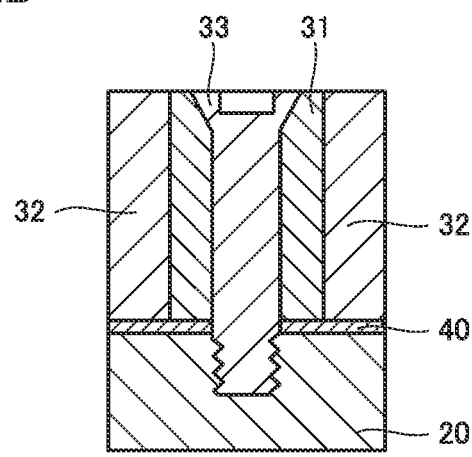
FIG. 2B is a cross-sectional view of a rotary cutting blade material showing still another aspect of the present embodiment.

When core portion 31 has a hollow shape, an inner core portion 33 made of the hard material forming attaching structure forming portion 20 or any material such as steel different from the materials forming core portion 31 and attaching structure forming portion 20 may be provided in the hollow portion of core portion 31 as shown in FIG. 2A. How to provide inner core portion 33 is not particularly limited. For example, as shown in FIG. 2A, inner core portion 33 having a shape identical to that of the hollow portion of core portion 31 may be fixed to the above-described hollow portion by screw-in, shrinkage fitting or brazing. Alternatively, as shown in FIG. 2B, inner core portion 33 may be shaped like a pin having a thread groove at a tip end of inner core portion 33 on the attaching structure forming portion 20 side such that inner core portion 33 and attaching structure forming portion 20 are fixed by a fixture such as a screw or a pin. In this case, the other tip end of inner core portion 33 is formed to have a shape of a head of the screw or the pin.

Figure 2C:
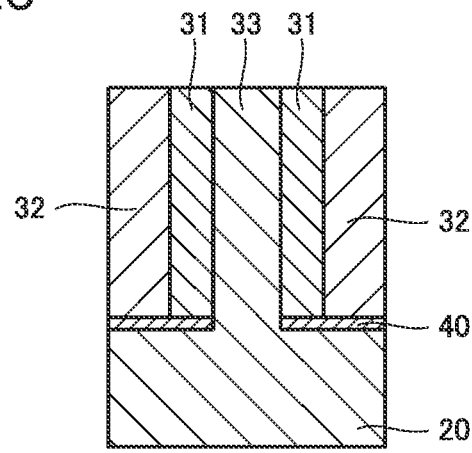
FIG. 2C is a cross-sectional view of a rotary cutting blade material showing a further aspect of the present embodiment.

When inner core portion 33 made of a material identical to the hard material forming attaching structure forming portion 20 is arranged in the hollow portion of core portion 31, inner core portion 33 provided in the hollow portion of core portion 31 and attaching structure forming portion 20 may be integrally formed, and attaching structure forming portion 20 and cutting structure forming portion 30 may be assembled such that inner core portion 33 is arranged in the hollow portion of core portion 31, as shown in FIG. 2C. When inner core portion 33 made of the material identical to the hard material forming attaching structure forming portion 20 is formed integrally with attaching structure forming portion 20 as described above, the vibration reducing property of obtained rotary cutting blade 10 can be further improved.

FIGS. 1B and 2A to 2C show core portion 31 and inner core portion 33 each having a rectangular longitudinal cross section (which is a cross section in the direction perpendicular to the joint surface to attaching structure forming portion 20, and corresponds to a cross section taken along line A-A in FIG. 1A). However, core portion 31 and inner core portion 33 may have an identical longitudinal cross-sectional shape or different longitudinal cross-sectional shapes, and the shape of the longitudinal cross section may be any shape such as a trapezoidal shape and a triangular shape.

Core portion 31 is made of a cemented carbide material. The cemented carbide material is, for example, a material including tungsten carbide and cobalt. Since the cemented carbide material is used for core portion 31, the hardness of core portion 31 can be made lower than that of surface portion 32 made of PCD or CBN. As a result, the hardness of cutting structure forming portion 30 having above-described core portion 31 can be made lower than the hardness in the case of forming cutting structure forming portion 30 as a whole from PCD or CBN only. Therefore, cutting processing and grinding processing for forming the cutting blade can be facilitated, and cutting structure forming portion 30 excellent in processability of the cutting blade can be provided.

In addition, since the cemented carbide material is used for core portion 31, an excellent joined state of core portion 31 and surface portion 32 including PCD or CBN can be obtained when a molded body of core portion 31 and a molded body of surface portion 32 are assembled and sintered as described below.

A content ratio between tungsten carbide and cobalt included in the cemented carbide material forming core portion 31 is not particularly limited. However, a content of tungsten carbide is preferably not lower than 75% by mass, and more preferably not lower than 85% by mass, with respect to a total mass of tungsten carbide and cobalt. In addition, the content of tungsten carbide is preferably not higher than 98% by mass, and more preferably not higher than 95% by mass, with respect to the total mass of tungsten carbide and cobalt. When the content of tungsten carbide is not lower than 75% by mass with respect to the total mass of tungsten carbide and cobalt, the strength of the core portion can be ensured. When the content of tungsten carbide is not higher than 98% by mass with respect to the total mass of tungsten carbide and cobalt, excellent joining to surface portion 32 can be achieved.

The cemented carbide material may include a component other than tungsten carbide and cobalt. Examples of the other component can include one or two or more types of TiC, TaC, Ni and the like. A content of the other component is preferably not higher than 10% by mass, and more preferably not higher than 5% by mass, with respect to a total mass of the cemented carbide material.

(Surface Portion)

As shown in FIGS. 1A and 1B, surface portion 32 in the present embodiment has a cylindrical shape having a hollow portion that accommodates above-described core portion 31 in the center. As shown in FIG. 1B, surface portion 32 is joined to attaching structure forming portion 20 and is concentrically provided on an outer circumference of a side surface of cylindrical core portion 31, to thereby form cutting structure forming portion 30 having a cylindrical shape as a whole, together with core portion 31. In the portion where surface portion 32 covers core portion 31, surface portion 32 is joined to core portion 31 by sintering described below.

Surface portion 32 has a joint surface joined to the attaching structure forming portion, and is provided to cover at least a part of the surface of core portion 31. Specifically, surface portion 32 may be provided only on a side surface portion of the surface of core portion 31 as shown in FIGS. 1B and 2A to 2C, or may be provided on the side surface and a top surface of core portion 31 such that the surface of core portion 31 is not exposed to the outside as shown in FIG. 3. As a result, rotary cutting blade 10 having the cutting blade formed on surface portion 32 can also be manufactured at a tip end portion of cutting portion 3.

A shape and a size of surface portion 32 are not particularly limited as long as surface portion 32 can be joined to core portion 31 and the cutting blade can be formed by performing cutting processing or grinding processing on cutting structure forming portion 30. Therefore, surface portion 32 may be formed to have an outer shape different from that of core portion 31, and an outer shape of cutting structure forming portion 30 may be formed into any shape such as an elliptic cylindrical shape, a polygonal prism shape including a triangular prism shape, a quadrangular prism shape and the like, a conical shape, and a polygonal pyramid shape. Cutting processing or grinding processing for forming the cutting blade may be performed only on surface portion 32, or may be performed on both surface portion 32 and core portion 31.

Surface portion 32 is made of a material including PCD (polycrystalline diamond) or CBN (cubic boron nitride). Since surface portion 32 is made of the material including PCD or CBN, a rotary cutting tool excellent in wear resistance and breakage resistance can be formed. Surface portion 32 is preferably made of a material including CBN.

(Joint Portion)

Joint portion 40 is formed on a joint surface between attaching structure forming portion 20 and cutting structure forming portion 30. Joint portion 40 has at least a first joint portion that joins the joint surface of attaching structure forming portion 20 and core portion 31 of cutting structure forming portion 30, and a second joint portion that joins the joint surface of attaching structure forming portion 20 and surface portion 32 of cutting structure forming portion 30. A thickness of joint portion 40 is not particularly limited as long as a necessary joining strength is obtained. For example, the thickness of joint portion 40 may be set to 5 μm to 200 μm.

By providing joint portion 40, attaching structure forming portion 20 and cutting structure forming portion 30 can be joined firmly. As a result, when the rotary cutting blade material in the present embodiment is processed into rotary cutting blade 10 for use, separation between cutting portion 3 formed from cutting structure forming portion 30 and attaching portion 2 formed from attaching structure forming portion 20 can be prevented, and occurrence of a crack in cutting portion 3 and attaching portion 2 can be prevented, and thus, the strength when used as rotary cutting blade 10 can be ensured. In order to allow suitable use as rotary cutting blade 10, the strength of joint portion 40 measured in accordance with a shear test is preferably not less than 25 kgf/mm$^2$, and preferably not less than 30 kgf/mm$^2$.

In order to join attaching structure forming portion 20 and cutting structure forming portion 30, joint portion 40 may be made of a material including one or two or more types of iron group elements composed of cobalt, iron and nickel. Since the second joint portion of the joint portion that joins attaching structure forming portion 20 and surface portion 32 is a joint portion made of the material including one or two or more types of iron group elements, the joining property between attaching structure forming portion 20 and surface portion 32 of cutting structure forming portion 30 can be improved.

Joint portion 40 may be formed by sintering attaching structure forming portion 20 and cutting structure forming portion 30. Specifically, during sintering, attaching structure forming portion 20 and core portion 31 of cutting structure forming portion 30 can form joint portion 40 due to the iron group element included in attaching structure forming portion 20 and a small amount of cobalt component included in core portion 31. When PCD is used as surface portion 32 of cutting structure forming portion 30, joint portion 40 can also be formed between attaching structure forming portion 20 and surface portion 32 during sintering. However, when CBN low in cobalt component content is used as surface portion 32, a reduction in joining property is likely to become a problem. Therefore, when surface portion 32 includes CBN, it is preferable to provide joint portion 40 including the above-described iron group element. As a result, surface portion 32 including CBN and attaching structure forming portion 20 can be joined at a joining strength of not less than 30 kgf/mm$^2$.

Joint portion 40 may include both the joint portion made of a material including one or two or more types of iron group elements and the joint portion formed by sintering, or may include only one of these joint portions. For example, the first joint portion that joins attaching structure forming portion 20 and core portion 31 may be formed by sintering, and the second joint portion that joins attaching structure forming portion 20 and surface portion 32 may be made of the material including one or two or more types of iron group elements.

[Method for Manufacturing Rotary Cutting Blade Material]

The rotary cutting blade material in the present embodiment is manufactured through an assembling step of forming a first precursor that is to serve as attaching structure forming portion 20, a second precursor that is to serve as core portion 31, and a third precursor that is to serve as surface portion 32, and assembling these first to third precursors, and a sintering step of sintering a precursor of the rotary cutting blade material assembled in the assembling step. Each of the precursors of attaching structure forming portion 20, core portion 31 and surface portion 32 can be manufactured in accordance with a conventionally known method, and a molded body obtained by putting a raw material powder into a mold and performing press molding, or a blank workpiece obtained by processing a blank member and the like of each material into a prescribed shape by cutting processing or grinding processing can, for example, be used. Since each precursor contracts by sintering, it is preferable to prepare the mold for forming the molded body and the blank workpiece that are sized to take into account the degree of contraction of each precursor.

The precursor of core portion 31 is fitted by push-in into a hollow portion of the precursor of surface portion 32 obtained as described above, to thereby form a precursor that is to serve as cutting structure forming portion 30. Next, the precursor that is to serve as cutting structure forming portion 30 is assembled such that the precursor of core portion 31 and the precursor of surface portion 32 are arranged to be in contact with the precursor of attaching structure forming portion 20, to thereby obtain a precursor of the rotary cutting blade material, and this precursor is sintered. As a result of this sintering step, core portion 31 and surface portion 32 are joined, and joint portion 40 including cobalt is formed between core portion 31 and attaching structure forming portion 20. When surface portion 32 is made of PCD, joint portion 40 including cobalt is formed between surface portion 32 and attaching structure forming portion 20.

On the other hand, when the precursor of core portion 31 and the precursor of surface portion 32 are arranged on the precursor of attaching structure forming portion 20, with a material including one or two or more types of iron group elements composed of nickel, iron and cobalt being interposed, during assembling of the above-described precursors, and then, sintering is performed, joint portion 40 including the above-described iron group element is formed. The material including the iron group element may be arranged between the precursors in the form of powder or in the form of foil.

The sintering step may be performed under the conventionally known conditions. However, in the present embodiment, different materials are used for attaching structure forming portion 20, core portion 31 and surface portion 32, and thus, the degree of deformation during sintering varies. Due to this difference in deformation, a crack may occur in a portion where the molded bodies of attaching structure forming portion 20, core portion 31 and surface portion 32 are in contact with one another. Therefore, in the sintering step, sintering is performed under the conditions that a pressure is 4.5 GPa to 7.5 GPa and a temperature is 1200 to 1700° C., and thereafter, with the temperature being maintained, the pressure is reduced to 3 GPa to 4 GPa to release compression of core portion 31, and then, the pressure is set to ordinary pressure and the temperature is set to ordinary temperature. As a result, a crack does not occur in the portion where the molded bodies are in contact with one another, and thus, the excellent joining property can be obtained in the portion where the molded bodies are in contact with one another.

[Intended Use]

The rotary cutting blade material in the present disclosure can be suitably used as rotary cutting blade 10 of a rotary cutting tool such as a drill and an end mill as shown in FIG. 5.

EXAMPLE

In Examples and Comparative Examples described below, measurement and evaluation were performed as follows.

[Young's Modulus and Elongation]

A test piece of a strip shape having a length of 30 mm and a width of 5 mm was prepared, and this test piece was subjected to a tensile test at a tensile speed of 0.1 mm/min using Autograph (manufactured by Shimadzu Corporation), to thereby measure a Young's modulus and an elongation in accordance with a strain gauge method.

[Evaluation of Vibrations]

Using the rotary cutting tool obtained in each of Examples and Comparative Examples, die steel was cut at a cutting speed V of 600 m/min, a feed amount fz of 0.1 mm, a cutting amount Ae of 0.2 mm, and Ap of 2.5 mm, to thereby evaluate vibrations with a vibrometer (manufactured by KEYENCE).

A: The value measured by the vibrometer was small (smaller than 1.5 m/s$^2$) and the vibration reducing property during use of the rotary cutting tool was very excellent.

B: The value measured by the vibrometer was medium (not smaller than 1.5 m/s$^2$ and smaller than 3.0 m/s$^2$) and the vibration reducing property during use of the rotary cutting tool was excellent.

C: The value measured by the vibrometer was large (not smaller than 3.0 m/s$^2$) and the vibration reducing property during use of the rotary cutting tool was insufficient.

[Evaluation of Breakage]

Using the rotary cutting tool obtained in each of Examples and Comparative Examples, die steel was cut at a cutting speed V of 600 m/min, a feed amount fz of 0.3 mm, a cutting amount Ae of 0.2 mm, and Ap of 2.5 mm, to thereby evaluate the presence or absence of breakage of the rotary cutting blade (cutting head).

Example 1

First, in order to form each of cylindrical attaching structure forming portion 20, cylindrical core portion 31 and hollow cylindrical surface portion 32 shown in FIGS. 1A and 1B by sintering, the powder materials described below were used and press molding was performed with a mold, to thereby obtain a molded body for the attaching structure forming portion, a molded body for the core portion, and a molded body for the surface portion.

Molded body for attaching structure forming portion
material: a hard material (Young's modulus: 280 GPa, elongation: 0.4%) including 90% by mass of tungsten and 10% by mass of a metal binder including iron, nickel and copper Molded body for core portion
material: a powder of a cemented carbide material including 94% by mass of tungsten carbide and 6% by mass of cobalt
pressure during press molding: 100 MPa to 200 MPa Molded body for surface portion
powder material: a powder of a material including CBN and an unavoidable impurity
pressure during press molding: 100 MPa to 200 MPa Next, the molded body for the core portion was fitted by push-in into a hollow portion of the molded body for the surface portion obtained as described above, to thereby obtain a molded body for the cutting structure forming portion. Next, a thin plate including 100% by mass of nickel was arranged on a joint surface of the molded body for the attaching structure forming portion in order to form joint portion 40, and the molded body for the core portion and the molded body for the surface portion were arranged on this thin plate. The above-described molded bodies were thus assembled.

The molded bodies assembled as described above were sintered under the conditions that a temperature was 1400° C. and a pressure was 5 GPa, to thereby obtain rotary cutting blade material 1. Rotary cutting blade material 1 thus obtained had a diameter of 8 mm and a height of 20 mm, attaching structure forming portion 20 had a height of 12 mm, core portion 31 had a diameter of 5 mm, surface portion 32 had a thickness in a circumferential direction of 1.5 mm, and core portion 31 and surface portion 32 had a height of 5 mm.

A four-blade (torsion angle: 45°) cutting blade was formed on cutting structure forming portion 30 of obtained rotary cutting blade material 1, and a thread groove was formed in attaching structure forming portion 20 so as to be fastened to a screw of superhard shank 5 having a diameter of 7.5 mm and a length of 75 mm, to thereby obtain a rotary cutting tool. As to the rotary cutting tool thus obtained, vibrations and breakage during the rotary cutting operation were evaluated. The result is shown in Table 1.

Comparative Example 1

A rotary cutting blade material and a rotary cutting tool were obtained similarly to Example 1, except that the cemented carbide material (Young's modulus: 620 GPa, elongation: 0.5%) used as the material of the molded body for the core portion in Example 1 was used as the material of the molded body for the attaching structure forming portion.

As to the rotary cutting tool thus obtained, vibrations and breakage during the rotary cutting operation were evaluated. The result is shown in Table 1.

Based on comparison between Example 1 and Comparative Example 1, it became clear that when the attaching structure forming portion is made of the hard material, the excellent vibration reducing property during the rotary cutting operation can be achieved and breakage can be suppressed.

Examples 2 to 3

A rotary cutting blade material and a rotary cutting tool were obtained similarly to Example 1, except that the materials described below were used as the material of the molded body for the attaching structure forming portion.

Molded body for attaching structure forming portion
(Material in Example 2)
a hard material (Young's modulus: 300 GPa, elongation: 5%) including 95% by mass of tungsten and 5% by mass of a metal binder including iron, nickel and copper
(Material in Example 3)
a hard material (Young's modulus: 350 GPa, elongation: 25%) including 95% by mass of tungsten and 5% by mass of a metal binder including iron, nickel and copper As to the rotary cutting tool thus obtained, vibrations and breakage during the rotary cutting operation were evaluated. The result is shown in Table 1.

Based on comparison among Examples 1 to 3, it became clear that as the Young's modulus of the attaching structure forming portion becomes smaller, the excellent vibration reducing property of the obtained rotary cutting tool can be achieved and breakage can be prevented.

TABLE 1

| | Hard metal material | | | |
|---|---|---|---|---|
| | Young's modulus [GPa] | Elongation [%] | Evaluation of vibrations | Evaluation of breakage |
| Example 1 | 280 | 0.4 | A | no breakage |
| Example 2 | 300 | 5 | A | no breakage |
| Example 3 | 350 | 25 | B | no breakage |
| Comparative Example 1 | 620 | 0.5 | C | breakage |

While the embodiment and the examples of the present invention have been described above, it is initially intended to combine the features of each of the embodiment and the examples described above as appropriate.

It should be understood that the embodiment and the examples disclosed herein are illustrative and non-restrictive in every respect. The scope of the present invention is defined by the terms of the claims, rather than the embodiment and the examples described above, and is intended to include any modifications within the scope and meaning equivalent to the terms of the claims.

REFERENCE SIGNS LIST 1 rotary cutting blade material; 2 attaching portion; 3 cutting portion; 5 shank; 10 rotary cutting blade; 20 attaching structure forming portion; 30 cutting structure forming portion; 31 core portion; 32 surface portion; 33 inner core portion; 40 joint portion.

The invention claimed is:

1. A rotary cutting blade material for a rotary cutting blade attached to a shank for use,
the rotary cutting blade material having an attaching structure forming portion that is to serve as an attaching portion to the shank, a cutting structure forming portion that is to serve as a cutting blade, and a joint portion,
the cutting structure forming portion having a core portion and a surface portion provided on the attaching structure forming portion with the joint portion being interposed,
the surface portion covering at least a part of a surface of the core portion,
the attaching structure forming portion including a hard material including a hard component and one or two or more types of iron group elements, the hard material having a Young's modulus of not more than 350 GPa,
the core portion including a cemented carbide material,
the surface portion including PCD (polycrystalline diamond) or CBN (cubic boron nitride),
the hard component being at least one selected from the group consisting of W (tungsten), WC (tungsten carbide), TiC (titanium carbide), TiCN (titanium carbonitride), $Al_2O_3$ (alumina), and a combination of at least one of CBN (cubic boron nitride) and diamond and at least one of W and WC.

2. The rotary cutting blade material according to claim 1, wherein
the surface portion covers the core portion such that the core portion is not exposed to the outside.

3. The rotary cutting blade material according to claim 1, wherein
at least a part of the joint portion is a material including one or two or more types of iron group elements.

4. The rotary cutting blade material according to claim 1, wherein
a portion of the joint portion between the attaching structure forming portion and the surface portion includes one or two or more types of iron group elements.

5. The rotary cutting blade material according to claim 1, wherein
the core portion has a hollow portion therein, and
the attaching structure forming portion has an inner core portion arranged in the hollow portion.

6. The rotary cutting blade material according to claim 1, wherein
the hard material has a Young's modulus of less than 300 GPa.

7. The rotary cutting blade material according to claim 1, wherein
the hard material has an elongation of not more than 5%.

8. A rotary cutting blade material for a rotary cutting blade attached to a shank for use,
the rotary cutting blade material having an attaching structure forming portion that is to serve as an attaching portion to the shank, a cutting structure forming portion that is to serve as a cutting blade, and a joint portion,
the cutting structure forming portion having a core portion and a surface portion provided on the attaching structure forming portion with the joint portion being interposed,
the surface portion covering at least a part of a surface of the core portion,
the attaching structure forming portion including a hard material including W (tungsten), iron and nickel, the hard material having a Young's modulus of less than 300 GPa and an elongation of less than 5%,
the core portion including a cemented carbide material,
the surface portion including CBN (cubic boron nitride),
a portion of the joint portion between the attaching structure forming portion and the surface portion being a material including one or two or more types of iron group elements.

* * * * *